(12) United States Patent
Concialdi

(10) Patent No.: US 6,959,679 B2
(45) Date of Patent: Nov. 1, 2005

(54) AIR INTAKE DEVICE FOR INTERNAL COMBUSTION ENGINE

(75) Inventor: John P. Concialdi, Redondo Beach, CA (US)

(73) Assignee: Advanced Engine Management Inc., Hawthorne, CA (US)

( * ) Notice: Subject to any disclaimer, the term of this patent is extended or adjusted under 35 U.S.C. 154(b) by 0 days.

(21) Appl. No.: 10/678,278

(22) Filed: Oct. 6, 2003

(65) Prior Publication Data

US 2004/0094111 A1 May 20, 2004

Related U.S. Application Data

(60) Provisional application No. 60/426,417, filed on Nov. 15, 2002.

(51) Int. Cl.[7] .............................................. F02M 35/10
(52) U.S. Cl. ................... 123/184.57; 181/229; 181/249
(58) Field of Search .................. 123/184.53, 184.57; 181/229, 247–255

(56) References Cited

U.S. PATENT DOCUMENTS

| | | | | |
|---|---|---|---|---|
| 2,106,482 A | * | 1/1938 | Hargnett | 181/229 |
| 2,403,699 A | * | 7/1946 | Wilson | 181/241 |
| 2,894,497 A | | 7/1959 | Bolles, Jr. | |
| 3,500,805 A | | 3/1970 | Reisacher | |
| 3,990,415 A | | 11/1976 | Malphettes | |
| 4,116,303 A | * | 9/1978 | Trudell | 181/252 |
| 4,513,699 A | | 4/1985 | Cser | |
| 4,782,912 A | * | 11/1988 | Wandless | 181/229 |
| 4,928,638 A | | 5/1990 | Overbeck | |
| 5,025,889 A | * | 6/1991 | Lockwood et al. | 181/250 |
| 5,048,470 A | | 9/1991 | Geddes et al. | |
| 5,347,961 A | | 9/1994 | Buehrle, II et al. | |
| 5,722,358 A | | 3/1998 | Fuesser et al. | |
| 5,748,608 A | | 5/1998 | Spector | |
| 6,048,386 A | * | 4/2000 | Gillingham et al. | 181/231 |
| 6,135,079 A | | 10/2000 | Fuesser | |
| 6,167,857 B1 | | 1/2001 | McCord | |
| 6,260,528 B1 | | 7/2001 | Pringle et al. | |
| 6,431,136 B2 | | 8/2002 | Pietrowski et al. | |

FOREIGN PATENT DOCUMENTS

JP    A-63-285258    11/1988

* cited by examiner

Primary Examiner—Noah P. Kamen
(74) Attorney, Agent, or Firm—Berenato, White & Stavish

(57) ABSTRACT

An air intake device for an internal combustion engine comprises a primary inlet duct having an inlet opening, and a secondary inlet duct having a inlet end provided with an inlet opening and a rear end closed with a reflector wall. An outlet end of the primary duct is in fluid communication with the internal combustion engine, while the inlet opening of the secondary inlet duct is adapted to receive intake air. The primary inlet duct extends into the secondary inlet duct so as to form a double-tube chamber within the secondary inlet duct including a resonant cavity defined between the primary inlet duct and the secondary inlet duct. The double-tube chamber is sized so as to generate sound waves enhancing propagation of an intake air flow toward the at least one cylinder of the internal combustion engine through the primary inlet duct.

19 Claims, 3 Drawing Sheets

AIR INTAKE DEVICE FOR INTERNAL COMBUSTION ENGINE

CROSS-REFERENCE TO RELATED APPLICATION

This application claims the benefit under 35 U.S.C. 119(e) of U.S. Provisional Application Ser. No. 60/426,417 filed Nov. 15, 2002 by John Concialdi.

BACKGROUND OF THE INVENTION

1. Field of the Invention

The present invention relates to an air intake system for an internal combustion engine of motor vehicles in general, and more particularly to an air intake device having a dual tube resonant chamber tuned to generate multiple frequency sound waves enhancing volumetric efficiency of the internal combustion engine.

2. Description of the Prior Art

In known air intake systems for internal combustion engines, the length and cross-section of the individual intake pipes are configured (or tuned) in such a way that the respective cylinders are filled to an optimum degree at a particular engine speed by a resonance effect. Such an arrangement is known in the art as a passive system meaning that it has a fixed geometry requiring no moving parts, as opposed to an active system. Tuning maximizes air flow by using sound energy (pressure) to help charge the cylinders. A sound wave travels toward an "open" end of an inlet duct due to an interaction of a piston motion and overlap function of valves. When this wave exits the "open" end of the inlet duct, a secondary wave (second order resonant wave) travels back toward an inlet manifold. A frequency (timing) of this wave is tuned by a length of the inlet duct. An optimal frequency is one that coincides within a few degrees of an inlet valve-closing event for an RPM point where a power is required.

Known induction tuning of intake manifolds of internal combustion engines has been carried out by various devices.

One of the conventional solutions resides in the so-called suction pipe charging wherein an intake opening of each engine cylinder is coupled with a suction pipe/resonance tube of predetermined cross section and length. On most road cars the length and diameter of an inlet runner are tuned for the lower end of the useable RPM band of the engine since this is where most daily driving occurs. The use of a single length and diameter effects an optimal tuning at a somewhat narrow power band. The reason is because the frequency dictated by the pipe length and diameter remains the same, while the valve-closing event occurs at different frequencies dictated by the engine speed. This phenomenon causes the frequency of the sound wave to have stronger and weaker effects on a cylinder charging as the engine speed changes.

An expansion chamber resonator is another such device, in which the induction airflow passes into a relatively large volume chamber, and thence into the engine. The expansion chamber prevents the formation of large amplitude standing waves and dissipates the sound energy in the system. However, the use of such resonator chamber devices often still result in a characteristic decline in engine torque at a particular narrow range of engine speeds, since expansion chamber resonators typically are not effective at all noise frequencies.

Yet another device is the "Helmholtz" resonator which comprises a chamber which does not receive the induction air flow, but is in communication with the air flow path via a small diameter opening. The resonance of the Helmholtz resonator is limited to a narrow range of engine speeds and thus is not effective over the entire operational range of engine speeds, and hence it has also been proposed to provide an adaptive Helmholtz resonator which is tuned differently over a range of varying engine speeds design. Such approach, while effective, adds considerable complexity to the device.

Although those are effective strategies, they come at a cost as such gives up power at the top end of the engine speed range. In an effort to satisfy both of these competing interests, the automotive manufacturers have attempted to address this issue by making active, dual-path inlet systems, or moveable systems to broaden the power curve (known in the art as an active tuning). Unfortunately, developing an inlet design in this fashion is rather large, cumbersome, complex and expensive in manufacturing.

Thus, the need exists for a relatively simple, compact and inexpensive air intake device for internal combustion engines that increases the engine power and torque throughout a broad range of the engine speed in a passive manner.

SUMMARY OF THE INVENTION

The present invention provides a novel arrangement of an air intake device for an internal combustion (I.C.) engine. The air intake device of the present invention comprises a primary inlet duct having a front end provided with an inlet opening and an outlet end, and a secondary inlet duct having a inlet end provided with an inlet opening and a rear end closed with a reflector wall having a hole therethrough. The outlet end of the primary duct being in fluid communication with at least one cylinder of the internal combustion engine, while the inlet opening of the secondary inlet duct receiving intake air, preferably through an air filter. The primary inlet duct is rigidly fixed to the secondary inlet duct, preferably through the reflector wall.

The primary inlet duct extends through the hole in the reflector wall of the secondary inlet duct so that a portion of the primary inlet duct is disposed within the secondary inlet duct in a radially spaced relationship forming a double-tube chamber within the secondary inlet duct. The double-tube chamber includes a resonant cavity defined between the primary inlet duct and the secondary inlet duct. In accordance with the present invention, the double-tube chamber is sized so as to generate sound waves enhancing propagation of an intake air flow toward the at least one cylinder of the internal combustion engine through the primary inlet duct.

Preferably, both the primary and secondary inlet ducts have substantially constant, circular cross-section along the length thereof. Further preferably, the reflector wall is substantially orthogonal to an outer peripheral surface of the rear end of the secondary inlet duct.

In operation of the I.C. engine, a variation in pressure, i.e. an intake pulsation, periodically occurs near an intake port when an intake valve is opened, and closed. The pulsations are caused by an inlet valve opening and closing with a moving air column having interrupted flow due to this opening and closing action. This action is further accentuated by a piston motion toward a top dead center (TDC), while the inlet valve is in an overlap position. The intake pulsation and the movement of the piston toward TDC generates a primary sound wave of a specific frequency that is transmitted at a sonic speed upstream along a length of the primary inlet duct. As this primary sound wave enters a relatively large resonating volume of the double-tube chamber, it continues to down the now larger area of the secondary inlet duct and reflects off inner surface of the secondary inlet duct. The double-tube chamber 20 of the air intake device of the present invention, creates multiple frequency and amplitude sound waves that enhance propagation of the intake air flow toward the cylinder of the I.C. engine through the primary inlet duct, thus increasing a volumetric efficiency of the particular I.C. engine throughout a broad range of the engine speed, resulting in more power and torque.

In order to operate at its peak efficiency, the air intake device of the present invention should be specifically tuned for the specific application, i.e. to the particular I.C. engine it is intended to be used. More specifically, the tuning of the air intake device is determined mainly by two parameters: 1) a ratio of the diameter of the secondary inlet duct to the diameter of the primary inlet duct; and 2) an overlap length, determined as an overlap distance between the primary and secondary ducts. By manipulating the overlap length and the diameter ratio, it is possible to move engine torque and power gain anywhere in the range of the engine speed for any particular I.C. engine.

Both the primary and secondary inlet ducts and the reflector wall are made of a substantially rigid material having good acoustic properties adapted to generate, contain and reflect sound waves. The preferred material selected for manufacturing the primary and secondary inlet ducts is aluminum, or aluminum alloy. Alternatively, other materials may be used, such as steel and some of the engineering thermo-set plastics (such as a high-strength engineering polymer called Polyamide-imide, more commonly know as Torlon®, from Amoco Chemicals Co.). However, the use of aluminum is preferable because it is light weight, has good acoustic properties, and easy to work with.

Therefore, the air intake device for the I.C. engine in accordance with the present invention represents a novel, completely passive arrangement that increases the engine power and torque throughout a broad range of the engine speed. The air intake device of the present invention is relatively simple, compact and inexpensive in manufacturing.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
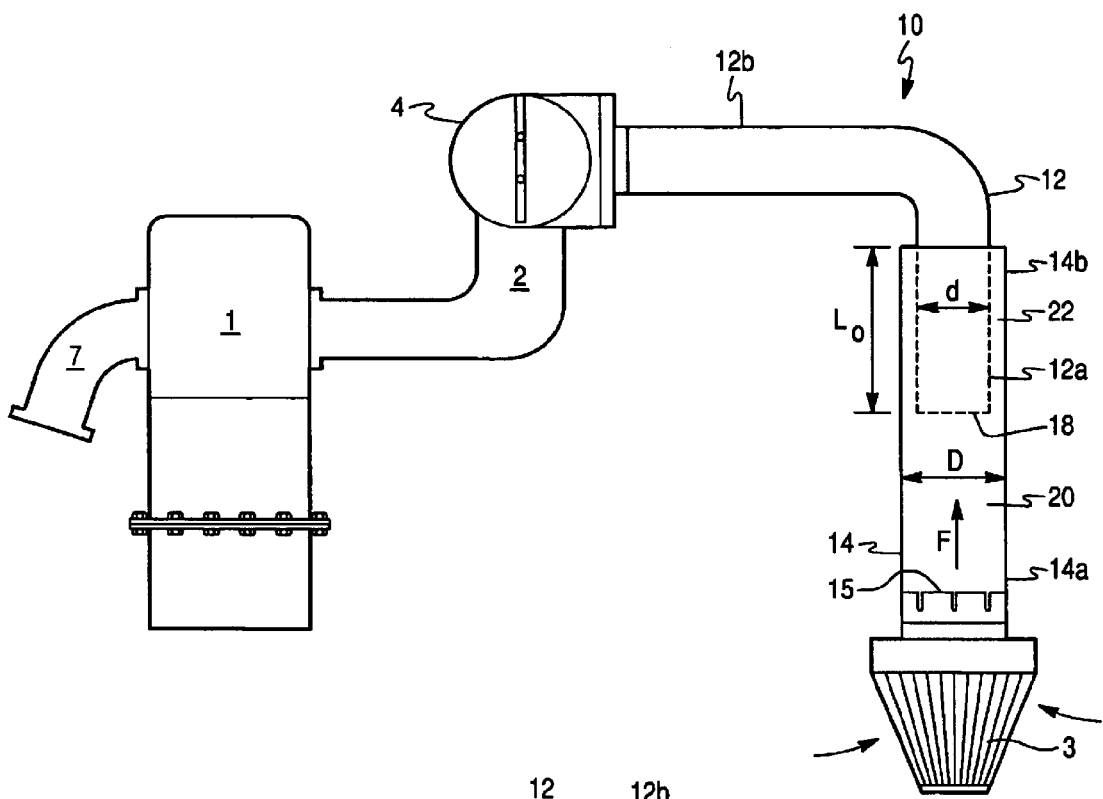
FIG. 1 is a schematic view of an I.C. engine in combination with an air intake device according to the present invention.

FIG. 1 schematically illustrates an internal combustion engine 1 in combination with an air inlet tract including an air intake device 10 through which an intake air flow according to arrow F is drawn through an air filter 3. The engine 1 is connected to an intake manifold 2 that conducts air from the air filter 3 through a throttle body 4 and into the engine 1 having at least one cylinder. Once the combustion cycle is completed, exhaust gas is exhausted out of the engine 1 through an exhaust manifold 7.

Figure 2:
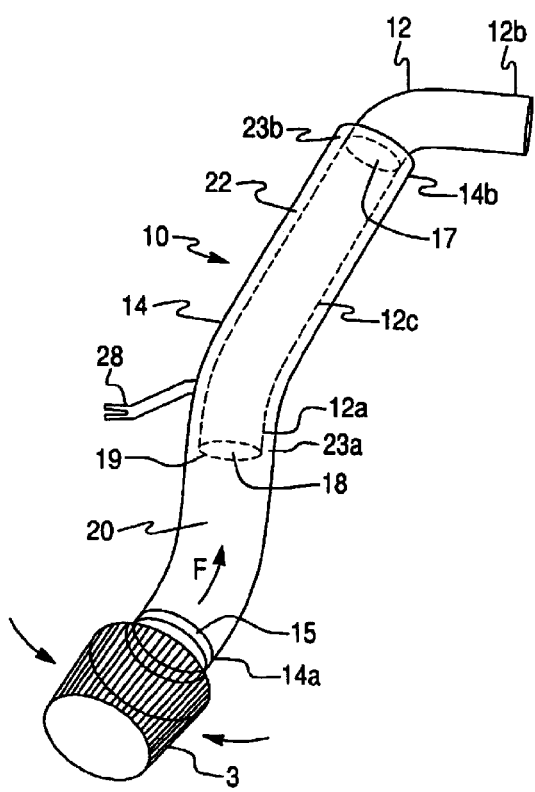
FIG. 2 is a perspective view of the air intake device according to the present invention.

The air intake device 10, illustrated in details in FIGS. 1 and 2, includes a pair of substantially rigid intake ducts: a primary inlet duct 12 in fluid communication with at least one cylinder (not shown) of the I.C. engine 1 through the throttle body 4, and a secondary inlet duct 14 fluidly connected to both the air filter 3 and the primary inlet duct 12. Furthermore, the primary inlet duct 12 is non-movably (rigidly) fixed to the secondary inlet duct 14, thus providing a passive arrangement of the air intake device 10 of the present invention. The passive arrangement (or system) means that the device has a fixed geometry requiring no moving parts, as opposed to an active system requiring moving parts to adjustably tune the system depending on specific engine parameters. Preferably, both the primary inlet duct 12 and the secondary inlet duct 14 have substantially circular cross-section, wherein the cross-section of the primary inlet duct 12 is characterized by a diameter d, while the cross-section of the secondary inlet duct 14 is characterized by a diameter D. Further preferably, the cross-section of both the primary inlet duct 12 and the secondary inlet duct 14 is substantially constant along the length thereof. Alternatively, the primary inlet duct 12 and the secondary inlet duct 14 may have variable diameter cross-section.

Figure 3:
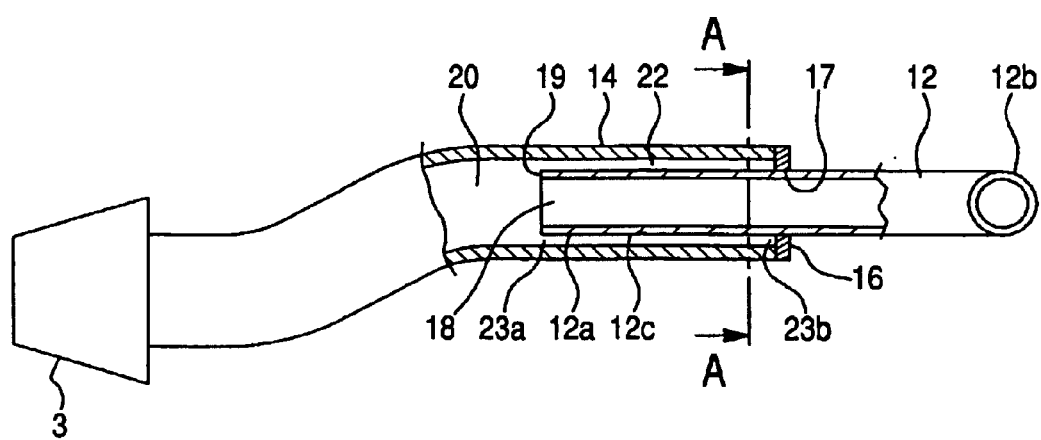
FIG. 3 is a sectional view of the air intake device according to the present invention.
Figure 4:
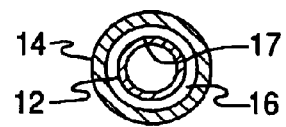
FIG. 4 is a cross-sectional view of the air intake device according to the present invention along the line A—A.

The secondary inlet duct 14 has an inlet end 14a provided with an inlet opening (15) fluidly coupling the air filter 3 to the secondary inlet duct 14, and a rear end 14b having a reflector wall 16 having a central hole 17 therethrough (shown in FIGS. 2–4). Preferably, the reflector wall 16 is substantially orthogonal to an outer peripheral surface of the rear end 14b of the secondary inlet duct 14, as illustrated in FIGS. 1 and 4. The inlet end 14a of the secondary inlet duct 14 extends to and is open at an appropriate location to conduct incoming air through the air filter 3 to feed the engine 1 from a source remote from the I.C. engine 1. This source can be an external scoop on the vehicle or engine shroud, or can simply be a source of relatively cooler air within the vicinity of the engine, i.e., lower in the engine compartment.

The primary inlet duct 12 has a front end 12a provided with an inlet opening 18, and an outlet end 12b fluidly coupled to the throttle body 4 leading the air flow F to the intake manifold 2 of the I.C. engine 1, as illustrated in detail in FIG. 1. As further illustrated in the FIGS. 1–4, the primary inlet duct 12 extends through the hole 17 in the reflector wall 16 of the secondary inlet duct 14 so that a portion 12c of the primary inlet duct 12 (shown in short dashes in FIGS. 1 and 2), is disposed within the secondary inlet duct 14 in a radially spaced relationship therewith, thus forming a double-tube chamber 20 within the secondary inlet duct 14 including an enclosed resonant cavity 22 defined by a space between the secondary inlet duct 14 and the primary inlet duct 12. As illustrated in detail in FIG. 3, the resonant cavity 22 is substantially cylindrical in shape and has a front open end 23a and a rear end 23b closed by the reflector wall 16. The double-tube chamber 20 is adapted to enhance a volumetric efficiency of the I.C. engine 1 as will be described below.

The air intake device 10 further includes at least one mounting bracket as illustrated in FIG. 2. The mounting bracket is adapted to secure the air intake device 10 within an engine compartment of a motor vehicle (not shown) to any appropriate structural part of the vehicle, such as a vehicle body or the I.C. engine.

It should be noted that in the art of the I.C. engines the volumetric efficiency of the I.C. engine is defined as a ratio of the amount of air or air-fuel mixture that actually enters the engine cylinder to the amount theoretically capable of entering the cylinder under ideal conditions. A number of factors affect the volumetric efficiency of the I.C. engine, such as an air temperature, valve overlap angle and intake valve closing angle, an angular velocity of the I.C. engine (hereinafter referred to as an engine speed), an intake duct length and configuration, etc. In turn, the volumetric efficiency affects an engine torque and power. Obviously, the higher the volumetric efficiency, the higher engine torque and power. An ordinary modern low-performance engine has a volumetric efficiency of about 80% at maximum torque, while a high performance engine has a volumetric efficiency of about 85 to 95% at maximum torque.

As further illustrated in detail in FIG. 1, the portion 12c of the primary inlet duct 12 extends within the secondary inlet duct 14 to a distance $L_{OL}$ defined as an overlap length, thus forming a substantially annular, cylindrical space between the secondary inlet duct 14 and, the portion 12c of the primary inlet duct 12 defining the resonant cavity 22 within the double-tube chamber 20. As shown in the accompanying drawing figures, the overlap length $L_{OL}$ is determined as a distance between a front edge 19 of the inlet opening 18 of the front end 12a of the primary inlet duct 12 and the reflector wall 16 of the secondary inlet duct 14. As clearly shown in the accompanying drawing figures, the diameter D of the secondary inlet duct 14 overlapping the portion 12c of the primary inlet duct 12, is larger than the diameter d of the portion 12c of the primary inlet duct 12. Preferably, the primary inlet duct 12 is longer than the secondary inlet duct 14.

The air intake device 10 of the present invention including the double-tube chamber 20, considerably increases the engine volumetric efficiency (the cylinder air charge), and power and torque throughout the entire engine speed range by taking advantage of acoustic effects which occur during the intake filling cycle. More specifically, in operation of the I.C. engine, a variation in pressure, i.e. an intake pulsation, periodically occurs near an intake port when an intake valve is opened and closed. The pulsations are caused by the intake valve opening and closing with the moving air column having interrupted flow due to this opening and closing action. This action is further accentuated by the piston motion toward a top dead center (TDC) while the intake valve is in an overlap position with an exhaust valve. The intake pulsation and the movement of the piston toward TDC generates a primary sound wave of a specific frequency that is transmitted at a sonic speed upstream along a length of the primary inlet duct 12. As this primary sound wave enters a relatively large resonating volume of the double-tube chamber 20, it continues to down the now larger area of the secondary inlet duct 14 without significant restriction, collision or suppression, that is, without sudden pressure increase, and reflects off inner surface of the secondary inlet duct 14. The reflection wave has the same wavelength and amplitude as those of the incident wave, and has an opposite propagation direction. Moreover, as the primary sound wave traverses the front edge 19 of the inlet opening 18 of the primary inlet duct 12, a secondary sound wave is generated in the direction opposite to the primary sound wave at a reduced amplitude. This secondary sound wave traveling toward the inlet valve significantly enhances the intake air flow F and increases the cylinder air charge, thus the volumetric efficiency of the I.C. engine.

Furthermore, the primary sound wave within the double-tube chamber 20 reflects off the walls of the secondary inlet duct 14 and travels into the resonant cavity 22. Because the sound waves tend to propagate along inside edges of ducts, the sound wave within the resonant cavity 22 is reflected off the reflector wall 16 and of a substantially orthogonal edge of a junction where the secondary inlet duct 14 is joined to the primary inlet duct 12. This now reflected sound wave enhances the secondary wave that is traveling down toward the inlet valve at higher engine speeds. The wave reflected within the resonant cavity 22 has a weak interaction with the primary sound wave at low engine speeds because its amplitude is relatively low at low engine speeds and grows stronger as engine speed increases.

Essentially, the air intake device 10 of the present invention having the double-tube chamber 20, creates multiple frequency and amplitude sound waves that enhance propagation of the intake air flow toward at least one cylinder of the I.C. engine through the primary inlet duct 12, thus increasing the volumetric efficiency of the particular I.C. engine throughout a broad range of the engine speed, resulting in more power and torque. More specifically, the smaller in diameter and longer primary inlet duct 12 helps generate lower frequency sound waves in the inlet tract that coincide with lower engine speed, while a larger, shorter secondary inlet duct 14 helps generate higher frequency sound waves with higher engine speed.

In order to operate at its peak efficiency, the air intake device 10 of the present invention should be specifically tuned for the specific application, i.e. to the particular I.C. engine it is designed for and intended to be used. More specifically, the tuning of the air intake device 10 of the present invention is determined mainly by two parameters: 1) a ratio $K_d$ of the diameter D of the secondary inlet duct 14 to the diameter d of the primary inlet duct 12; and 2) the overlap length $L_{OL}$. By manipulating the overlap length $L_{OL}$ and the diameter ratio $K_d$, it is possible to move engine torque and power gain anywhere in the range of the engine speed for any particular I.C. engine.

Obviously, the diameters of the air intake ducts 12 and 14 vary with application. Preferably, the air intake ducts of the following diameters are used in the air intake device of the present invention: 2.5", 2.75", 3.0', 3.5' and 4.0". It will be appreciated by those skilled in the art that the use of the air intake ducts of any other appropriate diameters is within the scope of the present invention. It will also be appreciated by those skilled in the art that there is no set ratio $K_d$ for the diameters of the primary and secondary intake ducts 12 and 14.

Figure 5:
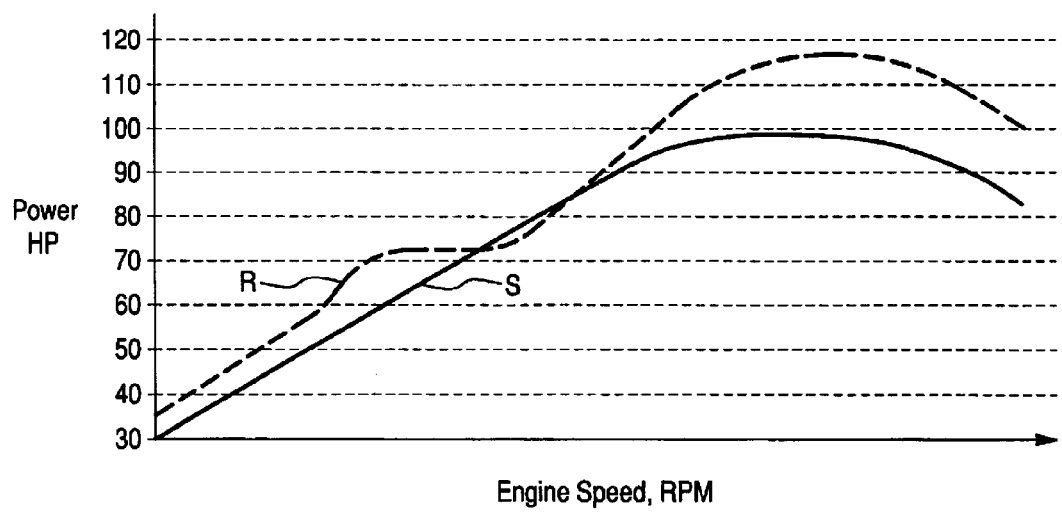
FIG. 5 shows comparative graphs of an engine power curve vs. an engine speed for a stock engine and an engine equipped with the air intake device according to the present invention.
Figure 6:
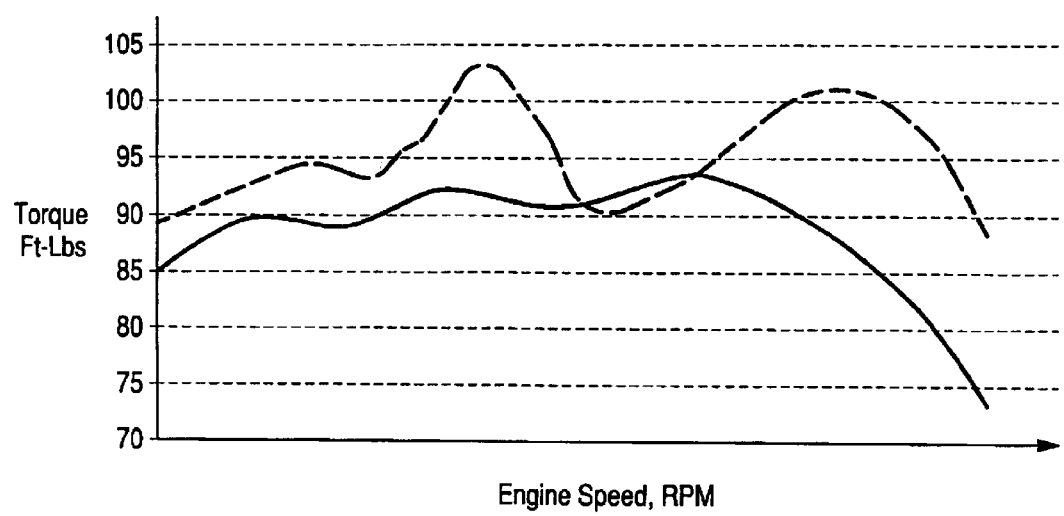
FIG. 6 shows comparative graphs of an engine torque curve vs. the engine speed for the stock engine and the engine equipped with the air intake device according to the present invention.

FIGS. 5 and 6 show comparative graphs of the engine power (HP) and torque (Ft.-Lbs) versus the engine speed (RPM) for Model Year (MY) 2000 Honda Civic EX with the stock 1.6 liter SOHC VTEC engine (solid lines) and MY 2000 Honda Civic EX with the stock 1.6 liter SOHC VTEC engine equipped with the air intake device 10 of the present invention specifically tuned for this particular engine (dash lines). As clearly seen on those drawings, the stock engine equipped vehicle demonstrated the maximum power of 106.8 hp and the maximum torque of 93.8 lbs-ft, while the same engine equipped with the air intake device of the present invention exhibited the maximum power 112.4 hp and the torque curve is up as well (about 97 lbs-ft), especially at higher engine speed of 4,600 rpm and up. The most important part of this device is the broad band of RPM that it is effective in. FIGS. 5 and 6 illustrate how the power and torque are increased throughout most of the RPM range.

In one of the exemplary embodiments of the air intake device of the present invention specifically tuned for an Acura RSX Type-S 2.0 liter DOHC engine (2003 MY), the air intake device of the present invention has the following dimensions: the diameter of the primary inlet duct is 3", the length of the primary inlet duct is 20", the diameter of the secondary inlet duct is 3", the length of the primary inlet duct is 20", and the overlap length is 7.75".

Currently we use the following diameters in the systems; 2.5", 2.75", 3.0', 3.5', and 4.0".

The dimensions of the air intake device 10 are derived from a modified version of Helmholtz theory for multiple cylinder engines employing the air intake device 10 of the present invention, according to the following equations:

$$f = \frac{1}{2}\pi \left\{ \frac{(\alpha\beta + \alpha + 1) \pm [(\alpha\beta + \alpha + 1)^2 - 4\alpha\beta]^{\frac{1}{2}}}{2\alpha\beta[(L_s - L_{OL})/(A_s - A_{OL})] \times V_{eff}} \right\}, \quad (1)$$

wherein:

$$\alpha = \frac{(L_s - L_{OL})/(A_s - A_{OL})}{(L_p/A_p)};$$

$$\beta = \frac{(L_s - L_{OL})/(A_s - A_{OL})}{V_{eff}};$$

f is frequency of sound generated by the engine that travels through the intake tract;

$V_{eff}$ is an Effective Intake Plenum Volume determined by the following equation:

$$V_d(r_c+1)/[2(r_c-1)], \quad (2)$$

wherein:
$V_d$ is a displaced cylinder volume;
$r_c$ is a compression ratio of the engine;
$L_p$ is a length of the primary inlet duct 12;
$L_s$ is a length of the secondary inlet duct 14;
$L_{OL}$ is the overlap length;
$A_p$ is an area of the primary inlet duct 12;
$A_s$ is an area of the secondary inlet duct 14;
$A_{OL}$ is an overlap area, $A_{OL}=A_s-A_p$, and $$\omega = \{v_s/(f \times N_v)/955\}, \quad (3)$$

wherein:
ω is a wavelength of sound waves traveling through the intake tract;
$v_s$ is a velocity of sound at the inlet air temperature (the standard of 15° C. (or 60° F.) is used);
$N_v$ is a total number of valves in the engine including intake valves and exhaust valves.

Using the frequency formula (1) and the wavelength formula (3) various tubing sizes, overlap values, and tubing lengths are used in calculations. When the wavelength and the flow length are of equal value, the system is tuned. Once these have been calculated, the theoretical data is confirmed on a dynamometer. It is not absolutely accurate, however it simplifies the design process substantially by giving a good starting point. Various permutations of the calculated results are tried to further fine tune the air intake device 10 of the present invention. These permutations can be but not limited to changes in the overlap length of the primary and secondary inlet ducts 12 and 14, the inlet duct lengths or the ratio of the diameters of the primary and secondary inlet ducts. When engine power has been optimized, the dimensions are recorded and a prototype is fabricated and tested to validate the results obtained in the dynamometer testing. Once this is completed, fine tuning on the dynamometer is done for the finalized intake design.

Both the primary and secondary inlet ducts and the reflector wall are made of a substantially rigid material having good acoustic properties adapted to generate, contain and reflect sound waves. The preferred material selected for manufacturing the primary and secondary inlet ducts is aluminum, or aluminum alloy. Alternatively, other materials may be used, such as steel and some of the engineering thermo-set plastics (such as a high-strength engineering polymer called Polyamide-imide, more commonly know as Torlon®, from Amoco Chemicals Co.). However, the use of aluminum is preferable because it is light weight, has good acoustic properties, and easy to work with. Steel ducts are heavy, while plastic materials have a good sound absorption ability which is counter productive in the present invention. Moreover, some plastic materials are prohibitively costly, such as Amaco Torlon®. It will be appreciated by those skilled in the art that the acoustic properties of the material used for manufacturing the air intake device are very important because the primary and secondary inlet ducts of the air intake device of the present invention generate, contain and reflect the sound waves (energy, pulses).

The primary and secondary inlet ducts of the air intake device according to preferred embodiment of the present invention are manufactured from the aluminum or aluminum alloy tubes having a thickness of 0.065".

Therefore, the present invention represents a novel arrangement of the air intake device for I.C. engines of the motor vehicles provided to generate multiple frequency and amplitude sound waves within the air inlet tract that substantially increases the volumetric efficiency of the particular I.C. engine (increase the cylinder air charge) throughout a broad range of the engine speed, resulting in more power and torque.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An air intake device in combination with an internal combustion engine, said device comprising:
a primary inlet duct having a front end provided with an inlet opening and an outlet end, said outlet end of said primary duct being in fluid communication with at least one cylinder of said internal combustion engine; and a secondary inlet duct having a inlet end provided with an inlet opening and a rear end closed with a reflector wall having a hole therethrough, said inlet opening of said secondary inlet duct receiving intake air;

said primary inlet duct extending through said hole in said reflector wall of said secondary inlet duct so that a portion of said primary inlet duct is disposed within said secondary inlet duct in a radially spaced relationship forming a double-tube chamber within said secondary inlet duct including a resonant cavity defined between said primary inlet duct and said secondary inlet duct;

said double-tube chamber is sized so as to generate sound waves enhancing propagation of an intake air flow toward said at least one cylinder of said internal combustion engine through said primary inlet duct.

2. The air intake device as defined in claim 1, wherein said inlet opening of said secondary inlet duct receives said intake air through an air filter connected to said inlet end of said secondary inlet duct.

3. The air intake device as defined in claim 1, wherein both said primary inlet duct and said secondary inlet duct have substantially circular cross-section.

4. The air intake device as defined in claim 3, wherein said cross-section of both said primary inlet duct and said secondary inlet duct is substantially constant along the length thereof.

5. The air intake device as defined in claim 1, wherein said reflector wall is substantially orthogonal to an outer peripheral surface of said rear end of said secondary inlet duct.

6. The air intake device as defined in claim 1, wherein both said primary inlet duct and said secondary inlet duct and said reflector wall are made of a substantially rigid material.

7. The air intake device as defined in claim 1, wherein said material is aluminum or aluminum alloy.

8. The air intake device as defined in claim 1, wherein said resonant cavity is substantially cylindrical in shape and has a front open end and a rear end closed by said reflector wall.

9. The air intake device as defined in claim 1, wherein said primary inlet duct is rigidly fixed to said secondary inlet duct.

10. The air intake device as defined in claim 9, wherein said primary inlet duct is rigidly fixed to said secondary inlet duct through said reflector wall.

11. An air intake device comprising:

a primary inlet duct having a front end provided with an inlet opening and an outlet end; and a secondary inlet duct having a inlet end provided with an inlet opening and a rear end closed with a reflector wall having a hole therethrough, said inlet opening of said secondary inlet duct provided for receiving ambient air;

said primary inlet duct extending through said hole in said reflector wall of said secondary inlet duct so that a portion of said primary inlet duct is disposed within said secondary inlet duct in a radially spaced relationship forming a double-tube chamber within said secondary inlet duct including a resonant cavity defined between said primary inlet duct and said secondary inlet duct;

said double-tube chamber is sized so as to generate sound waves enhancing propagation of an intake air flow through said air intake device in the direction from said inlet end of said secondary inlet duct toward said outlet end of said primary inlet duct, said inlet opening of said secondary inlet duct receiving said intake air through an air filter connected to said inlet end of said secondary inlet duct.

12. The air intake device as defined in claim 11, wherein both said primary inlet duct and said secondary inlet duct have substantially circular cross-section.

13. The air intake device as defined in claim 11, wherein said reflector wall is substantially orthogonal to an outer peripheral surface of said rear end of said secondary inlet duct.

14. The air intake device as defined in claim 11, wherein both said primary inlet duct and said secondary inlet duct and said reflector wall are made of a substantially rigid material.

15. The air intake device as defined in claim 11, wherein said material is aluminum or aluminum alloy.

16. The air intake device as defined in claim 11, wherein said resonant cavity is substantially cylindrical in shape and has a front open end and a rear end closed by said reflector wall.

17. The air intake device as defined in claim 11, wherein said primary inlet duct is rigidly fixed to said secondary inlet duct.

18. The air intake device as defined in claim 17, wherein said primary inlet duct is rigidly fixed to said secondary inlet duct through said reflector wall.

19. An air intake device, comprising:

a primary inlet duct having a front end provided with an inlet opening and an outlet end; and a secondary inlet duct having a inlet end provided with an inlet opening and a rear end closed with a reflector wall having a hole therethrough, said inlet opening of said secondary inlet duct provided for receiving ambient air;

said primary inlet duct extending through said hole in said reflector wall of said secondary inlet duct so that a portion of said primary inlet duct is disposed within said secondary inlet duct in a radially spaced relationship forming a double-tube chamber within said secondary inlet duct including a resonant cavity defined between said primary inlet duct and said secondary inlet duct;

said double-tube chamber is sized so as to generate sound waves enhancing propagation of an intake air flow through said air intake device in the direction from said inlet end of said secondary inlet duct toward said outlet end of said primary inlet duct;

both said primary inlet duct and said secondary inlet duct having substantially circular cross-section and said cross-section of both said primary inlet duct and said secondary inlet duct being substantially constant along the length thereof.

* * * * *